April 5, 1955
E. D. CLICKNER
2,705,601
FISHING REEL
Filed Oct. 15, 1952
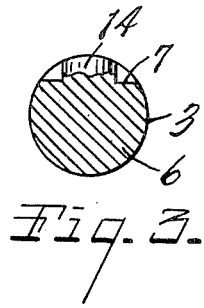
Fig. 3.
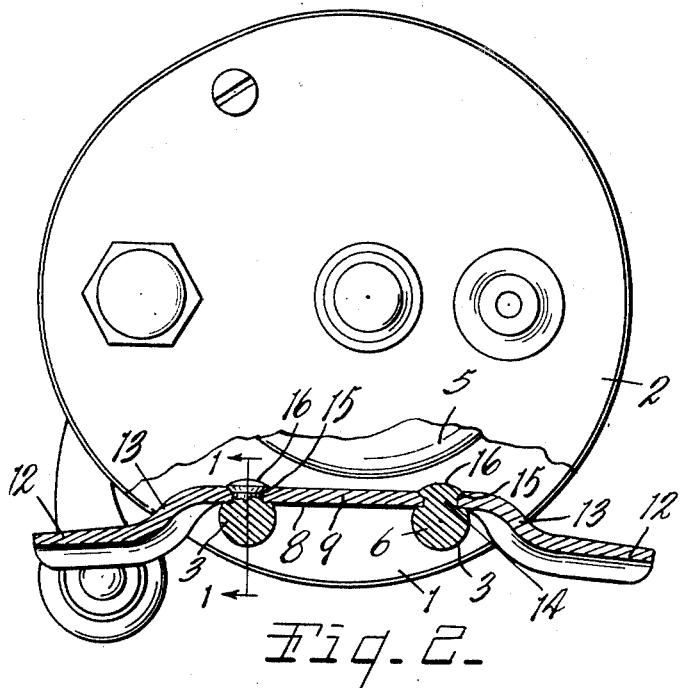
Fig. 2.
Fig. 1.
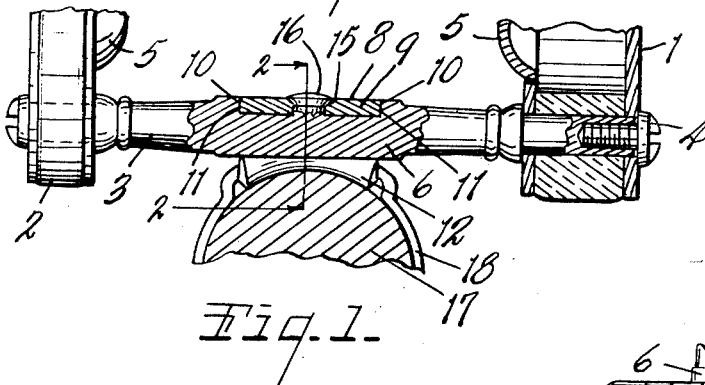
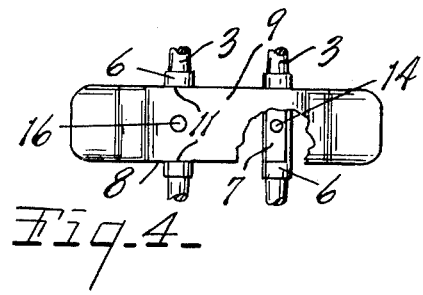
Fig. 4.
INVENTOR.
Earle D. Clickner
BY
Otis A. Earl
Attorney

United States Patent Office 2,705,601
Patented Apr. 5, 1955

2,705,601
FISHING REEL

Earle D. Clickner, Kalamazoo, Mich., assignor to Shakespeare Company, Kalamazoo, Mich., a corporation of Michigan Application October 15, 1952, Serial No. 314,931

3 Claims. (Cl. 242—84.1)

This invention relates to improvements in a fishing reel. The main objects of this invention are:

First, to provide a fishing reel in which the base plate or reel seat engaging plate is attached to the reel frame in a manner to very effectively withstand the stresses to which the connection is subjected in the use and handling of the reel generally.

Second, to provide a structure having these advantages which may be very economically produced and at the same time has a finished and attractive appearance.

Objects relating to details and economies of the invention will appear from the description to follow. The invention is defined and pointed out in the claims.

A preferred embodiment of the invention is illustrated in the accompanying drawing, in which:

Fig. 1 is an end elevatonal view partially broken away and in section on a line corresponding to line 1—1 of Fig. 2, a rod handle and reel seat being conventionally shown.

Fig. 2 is a fragmentary view partially in section on a line corresponding to line 2—2 of Fig. 1.

Fig. 3 is an enlarged fragmentary view partially in section through one of the pillars showing structural details thereof.

Fig. 4 is a fragmentary view illustrating details of the structure and connections for the base plate supporting pillars and the base plate.

Referring to the drawing, the reel frame comprises a head member 1 and tail member 2 connected by pillars 3—3. Additional pillars are ordinarily provided but are not illustrated as they are not directly concerned with this invention. The head member 1 is detachably secured to the pillars by screws 4 tapped into the pillars as shown in Fig. 1. Fragments of the spool flanges are shown at 5.

The pillars 4 are provided with enlarged cylindrical central portions 6 which have transverse recesses 7 milled in their inner sides to receive the base plate designated generally by the numeral 8.

The base plate 8 comprises a flat central portion 9 which is disposed on the inner side of the pillars with its edges 10 in supported engagement with the edges 11 of the recesses. The base plate has outwardly offset end portions 12 suitably conformed to engage the reel seat of a fishing rod and downwardly offset at 13 so that the reel seat engaging portions are in a plane at the outer side of the pillars. The pillars are formed with integral rivet portions 14 projecting centrally from the bottoms of the recesses 7.

The base plate is provided with countersunk holes 15 fittingly receiving the rivets and into which the rivets are upset, the headed rivets being shown at 16. Thus arranged the twisting stresses on the reel relative to the base plate are effectively sustained by the filling engagement of the side edges of the flat portion of the base plate with the ends of the recesses. The recesses are of a depth corresponding to the thickness of the base plate.

The rivets are formed in the cylindrical portions of the pillars and project from the bottoms of the recesses and through the openings in the base plate so that the rivets may be upset or headed, as is shown, to retainingly and clampingly hold the base plate to the pillars.

A rod handle is shown at 17 having a reel seat 18. The pillars are not materially weakened by the forming of the recesses therein as recesses are in the enlarged cylindrical portions of the pillars.

I have illustrated and described a very practical embodiment of my invention. I have not attempted to illustrate or describe other embodiments or adaptations as it is believed that this disclosure will enable those skilled in the art to embody or adapt the invention as may be desired.

Having thus described my invention, what I claim as new and desire to secure by Letters Patent is:

1. In a fishing reel, the combination of a reel frame comprising end members and a pair of laterally spaced connecting pillars therefor, said pillars having enlarged cylindrical central portions, and a base plate having a flat intermediate portion disposed on the inner sides of the pillars in supported relation thereto and having outwardly offset reel seat engaging end portions disposed in a plane at the outer side of the plane of said pillars, the cylindrical enlarged portions of said pillars having transversely aligned recesses on the inner sides thereof of a length corresponding to the width of the base plate and in which the base plate is disposed with its side edges in supported engagement with the edges of the recesses, the recesses being of a depth corresponding to the thickness of the base plate, said pillars having integral rivet portions projecting centrally from the bottoms of said recesses, said base plate having countersunk openings therein receiving said rivets and into which the rivets are upset.

2. In a fishing reel, the combination of a reel frame comprising end members and a pair of laterally spaced connecting pillars therefor, and a base plate having a flat intermediate portion disposed on the inner sides of the pillars in supported relation thereto and having outwardly offset reel seat engaging end portions disposed in a plane at the outer side of the plane of said pillars, said pillars having transversely aligned recesses on the inner sides thereof of a length corresponding to the width of the base plate and in which the base plate is disposed with its side edges in supported engagement with the edges of the recesses, the recesses being of a depth corresponding to the thickness of the base plate, said pillars having integral rivet portions projecting from the bottoms of said recesses, said base plate having countersunk openings therein receiving said rivets and into which the rivets are upset.

3. In a fishing reel, the combination of a reel frame comprising end members and a pair of laterally spaced connecting pillars therefor, and a base plate having an intermediate portion disposed on the inner sides of the pillars in supported relation thereto and having outwardly offset reel seat engaging end portions disposed in a plane at the outer side of the plane of said pillars, said pillars having transversely aligned recesses on the inner sides thereof of a length corresponding to the width of the base plate and in which the base plate is disposed with its side edges in supported engagement with the edges of the recesses, said pillars having integral rivet portions projecting from the bottoms of said recesses, said base plate having openings therein receiving said rivets and into which the rivets are upset.

References Cited in the file of this patent

UNITED STATES PATENTS

| | | |
|---|---|---|
| 1,901,091 | Fawcett | Mar. 14, 1933 |
| 2,305,360 | Trott | Dec. 15, 1942 |
| 2,314,032 | Coxe et al. | Mar. 16, 1943 |